United States Patent
Roberge

(10) Patent No.: US 10,781,772 B2
(45) Date of Patent: *Sep. 22, 2020

(54) INTEGRATED HEAT EXCHANGERS FOR LOW FAN PRESSURE RATIO GEARED TURBOFAN

(71) Applicant: United Technologies Corporation, Farmington, CT (US)

(72) Inventor: Gary D. Roberge, Tolland, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 186 days.

This patent is subject to a terminal disclaimer.

(21) Appl. No.: 15/953,791

(22) Filed: Apr. 16, 2018

(65) Prior Publication Data

US 2018/0238270 A1  Aug. 23, 2018

Related U.S. Application Data

(63) Continuation of application No. 14/646,990, filed as application No. PCT/US2013/068717 on Nov. 6, 2013, now Pat. No. 9,945,325.

(Continued)

(51) Int. Cl.
*F02K 3/115* (2006.01)
*F02K 3/105* (2006.01)
(Continued)

(52) U.S. Cl.
CPC .............. *F02K 3/115* (2013.01); *F01D 9/065* (2013.01); *F02C 7/06* (2013.01); *F02C 7/14* (2013.01);
(Continued)

(58) Field of Classification Search
CPC . F02K 3/115; F02K 3/06; F02K 3/105; F01D 9/065; F01D 25/02; F02C 7/06;
(Continued)

(56) References Cited

U.S. PATENT DOCUMENTS 3,830,058 A   8/1974  Ainsworth
4,645,415 A   2/1987  Hovan et al.
(Continued)

FOREIGN PATENT DOCUMENTS

GB   2204361 A    11/1988
WO   0238938 A1   5/2002

OTHER PUBLICATIONS

European Search Report for Application No. EP 13 87 5661.
(Continued)

*Primary Examiner* — Steven M Sutherland
(74) *Attorney, Agent, or Firm* — Cantor Colburn LLP

(57) ABSTRACT

An oil cooling system and method are provided for use with respect to a lubricated mechanical system within a bypass configured gas turbine engine. A surface cooler is fluidly linked to the lubricated mechanical system to receive oil from the lubricated mechanical system for cooling and reuse. In an embodiment, the surface cooler is mounted on an existing surface within the bypass airflow path of the bypass configured gas turbine engine to provide effective cooling while avoiding the introduction of additional aerodynamic disturbances in the bypass path. In an embodiment, the surface cooler is mounted on the fan casing or on a fan exit guide vane.

4 Claims, 6 Drawing Sheets

Related U.S. Application Data

(60) Provisional application No. 61/767,091, filed on Feb. 20, 2013.

(51) Int. Cl.
*F02C 7/06* (2006.01)
*F01D 9/06* (2006.01)
*F02K 3/06* (2006.01)
*F02C 7/14* (2006.01)
*F02C 7/18* (2006.01)

(52) U.S. Cl.
CPC .............. *F02C 7/18* (2013.01); *F02K 3/06* (2013.01); *F02K 3/105* (2013.01); *F05D 2210/12* (2013.01); *F05D 2240/123* (2013.01); *F05D 2240/124* (2013.01); *F05D 2250/182* (2013.01); *F05D 2250/60* (2013.01); *F05D 2260/20* (2013.01); *F05D 2260/213* (2013.01); *F05D 2260/4031* (2013.01); *F05D 2260/98* (2013.01); *Y02T 50/676* (2013.01)

(58) Field of Classification Search
CPC .... F02C 7/14; F02C 7/18; F02C 7/047; F05D 2260/20; F05D 2260/213; F05D 2260/98; B64D 2033/0233
See application file for complete search history.

(56) References Cited

U.S. PATENT DOCUMENTS

| | | |
|---|---|---|
| 4,782,658 A | 11/1988 | Perry |
| 4,914,904 A | 4/1990 | Parnes et al. |
| 5,729,969 A | 3/1998 | Porte |
| 8,257,024 B1 | 9/2012 | Phillips et al. |
| 2006/0042225 A1 | 3/2006 | Bruno |
| 2007/0215326 A1 | 9/2007 | Schwartz et al. |
| 2008/0095611 A1 | 4/2008 | Storage |
| 2010/0278642 A1 | 11/2010 | Olver |
| 2011/0146229 A1 | 6/2011 | Bajusz |
| 2011/0150634 A1 | 6/2011 | Bajusz |
| 2015/0285186 A1 | 10/2015 | Roberge |

OTHER PUBLICATIONS

International Search Report and Written Opinion for related International Application No. PCT/US13/68717; report dated Aug. 21, 2014.

INTEGRATED HEAT EXCHANGERS FOR LOW FAN PRESSURE RATIO GEARED TURBOFAN

CROSS-REFERENCE TO RELATED APPLICATIONS

This application is a Continuation of patent application Ser. No. 14/646,990 filed May 22, 2015, and further claims the benefit of an earlier filing date from PCT/US13/68717 filed on Nov. 6, 2013, and claims priority to U.S. Provisional Application 61/767,091 filed on Feb. 20, 2013, the entire disclosure of which is incorporated herein by reference in their entirety.

BACKGROUND

The subject matter of the present disclosure relates generally to bypass configured gas turbine engines, and more particularly, to a system and method for utilizing the fan bypass airstream to cool the gear reduction architecture.

Bypass configured gas turbine engines such as those used on jet aircraft generally comprise an inlet fan for providing air to an engine core as well as to a bypass path around the core. Indeed, in some modern engine concepts, the bypass ratio can be as high as 17:1 and as much as 80% of the total thrust developed by the engine may be a result of the bypass airflow. These types of systems are referred to herein as bypass configured gas turbines. The engine core consists of an air inlet, a single or multi-stage compressor chamber, a combustion chamber aft (downstream) of the compressor chamber, a turbine and an exhaust nozzle. Air entering the inlet flows axially through the compressor chamber and into the combustion chamber where it provides oxygen for fuel ignition. At the same time, a much larger volume of air enters and passes through the annular bypass path around the core.

In a conventional (non-geared) bypass configured gas turbine engine, for a given fan size intended to provide a desired airflow, the tip speed required for the inlet fan fixes the fan rotational speed and thus fixes the low pressure shaft rotational speed. As the bypass ratio increases, i.e., as the ratio of the fan diameter and the core inlet diameter increases, the establishment of a desired fan tip speed can result in an inadequate mechanical speed for components attached to the fan rotor resulting in increased number of compression and turbine stages to deliver desired component characteristics.

However, in a geared bypass configured gas turbine engine (geared turbofan or GTF) engine, a reduction architecture is incorporated between the fan and the low pressure shaft. This allows the low pressure shaft to turn at a higher rotational speed without over speeding the inlet fan. As a result, a GTF engine does not require the use of additional turbine/compressor stages as in a conventional bypass configured gas turbine engine.

However, with the advantages provided by the gearing in a GTF engine, there are also additional challenges that must be overcome. For example, an incremental amount of heat energy is created via friction in the gear reduction architecture, and failure to effectively dissipate this heat energy can shorten the lifetime of gear reduction architecture components. While the bypass airflow may provide a tempting source of cooling air, this flow is very vulnerable to interference, especially as fan pressure ratio is decreased, and any obstructions may adversely affect the efficiency of the engine.

Thus there is a need for a GTF engine gear reduction architecture cooling system and technique that allow the use of bypass air flow for cooling while at the same time avoiding a substantial adverse impact on engine efficiency.

In accordance with an aspect of the disclosure, a GTF engine is provided. The GTF engine includes a gear reduction architecture powered by a shaft of the engine and adapted to power the fan of the engine. The gear reduction architecture is lubricated and cooled via gear oil. Moreover, a surface cooler is provided that is adapted for mounting on a surface of the engine such that an exposed surface of the surface cooler is presented to an airflow associated with the engine. The surface cooler is fluidly linked to the gear reduction architecture to receive and cool the gear oil.

In accordance with another aspect of the disclosure, a gear cooling system for a GTF engine is provided. The cooling system includes a gear reduction architecture having an internal cavity adapted to contain lubricating oil as well as a surface cooler adapted for mounting to a surface of the engine. One or more fluid conduits link the gear reduction architecture cavity to the surface cooler such that the surface cooler reduces the temperature of the lubricating oil.

In accordance with yet another aspect of the disclosure, a method is provided for cooling lubricating oil used in a geared bypass configured gas turbine engine gear reduction architecture. The method entails mounting a surface cooler to a structure within or bounding a bypass path within the engine, excluding any shunt paths. Lubricating oil from the gear reduction architecture is then routed to the surface cooler such that during operation of the engine, the surface cooler is able to cool the lubricating oil.

Other features and advantages of the disclosed systems and methods will be appreciated from reading the attached detailed description in conjunction with the included drawing figures.

BRIEF DESCRIPTION OF THE DRAWINGS

As noted above, the disclosure pertains primarily to a system and method for utilizing the fan bypass airstream in a GTF engine to cool the gear reduction architecture. In overview, before reaching the details of the disclosure, the system of the present disclosure incorporates cooling elements into necessary structures within the bypass path, so that no additional obstructions are introduced. In addition, the configuration of the cooling elements allows for efficient cooling of the GTF engine gear architecture, protecting the architecture components from premature and/or excessive wear.

So that the manner in which the above recited concepts of the present disclosure may be understood in detail, a more particular description is provided by reference to the embodiments, which are illustrated in the accompanying drawings. It is to be noted, however, that the appended drawings illustrate only typical embodiments and are therefore not to be considered limiting with respect to the scope of the disclosure or claims. Rather, the concepts of the present disclosure may apply within other equally effective embodiments. Moreover, the drawings are not necessarily to scale, emphasis generally being placed upon illustrating the principles of certain embodiments.

Figure 1:
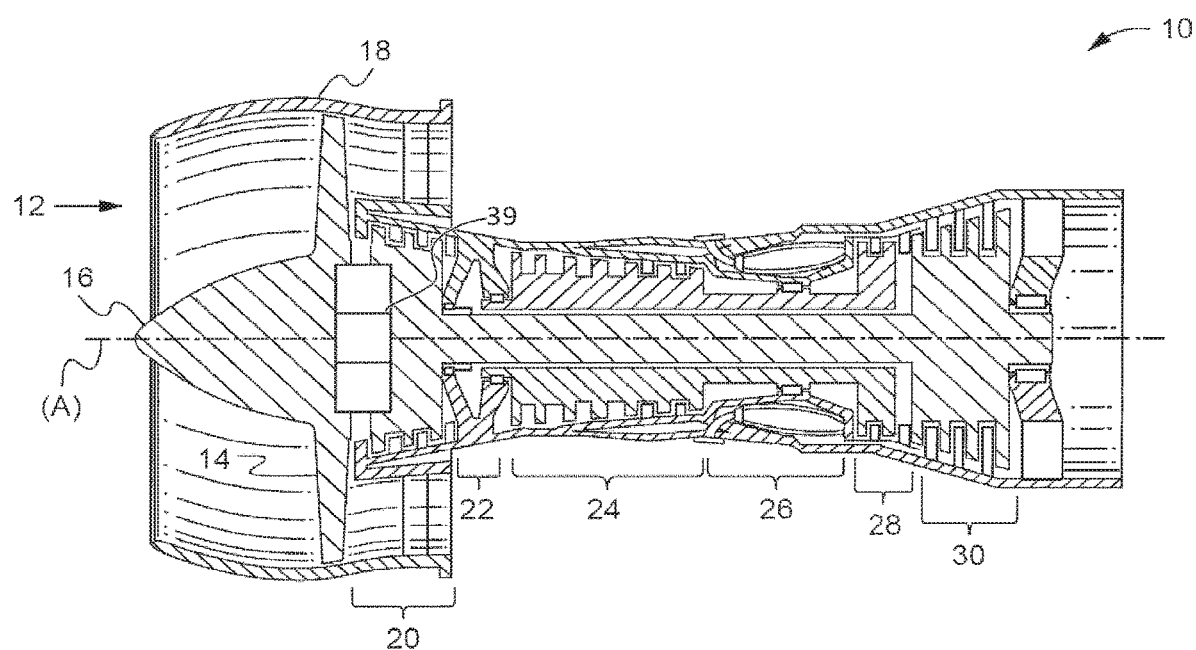
Figure 2:
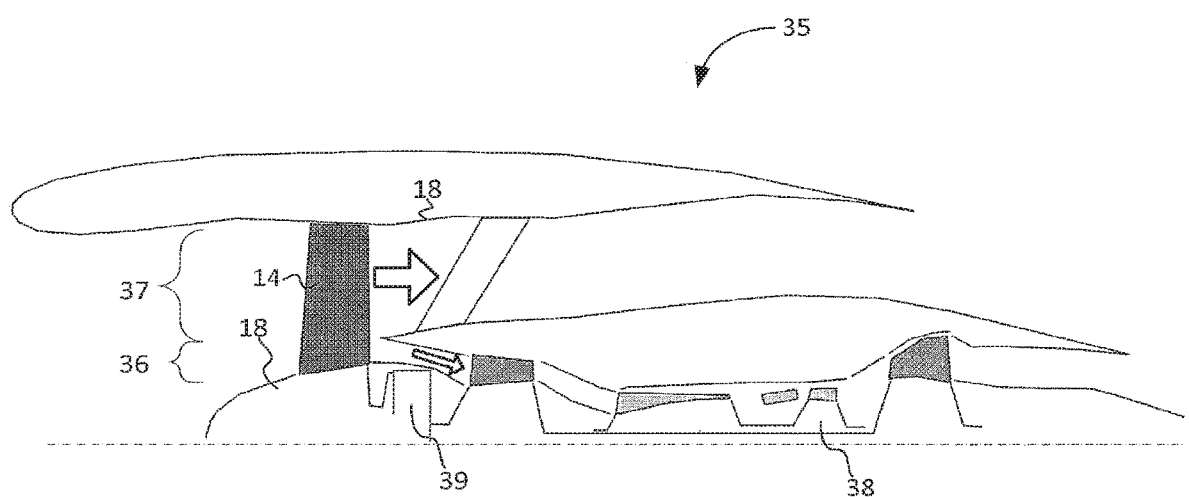
Figure 3:
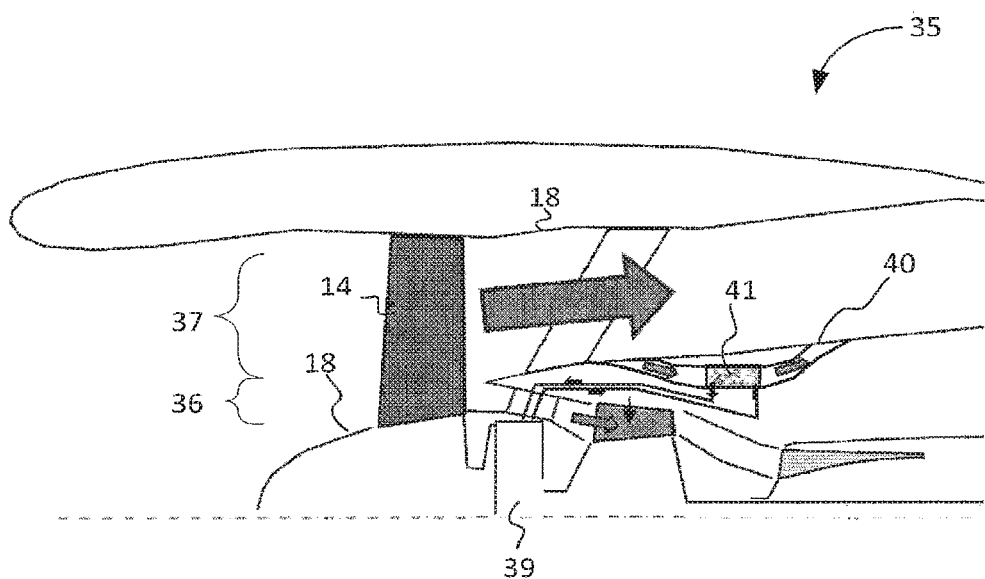
Figure 4:
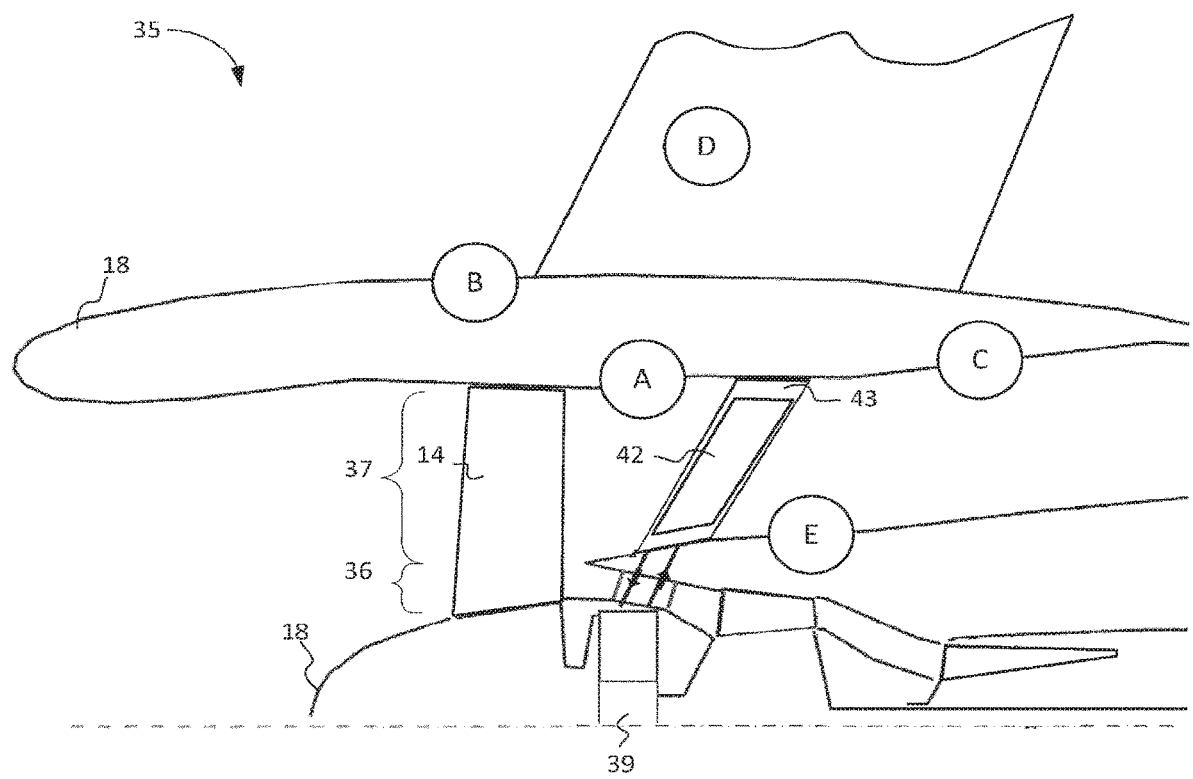
Figure 5:
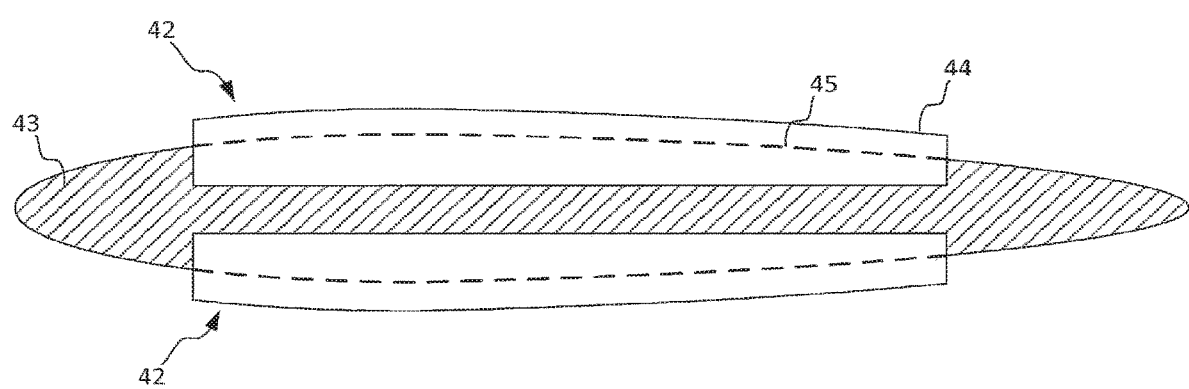
Figure 6:
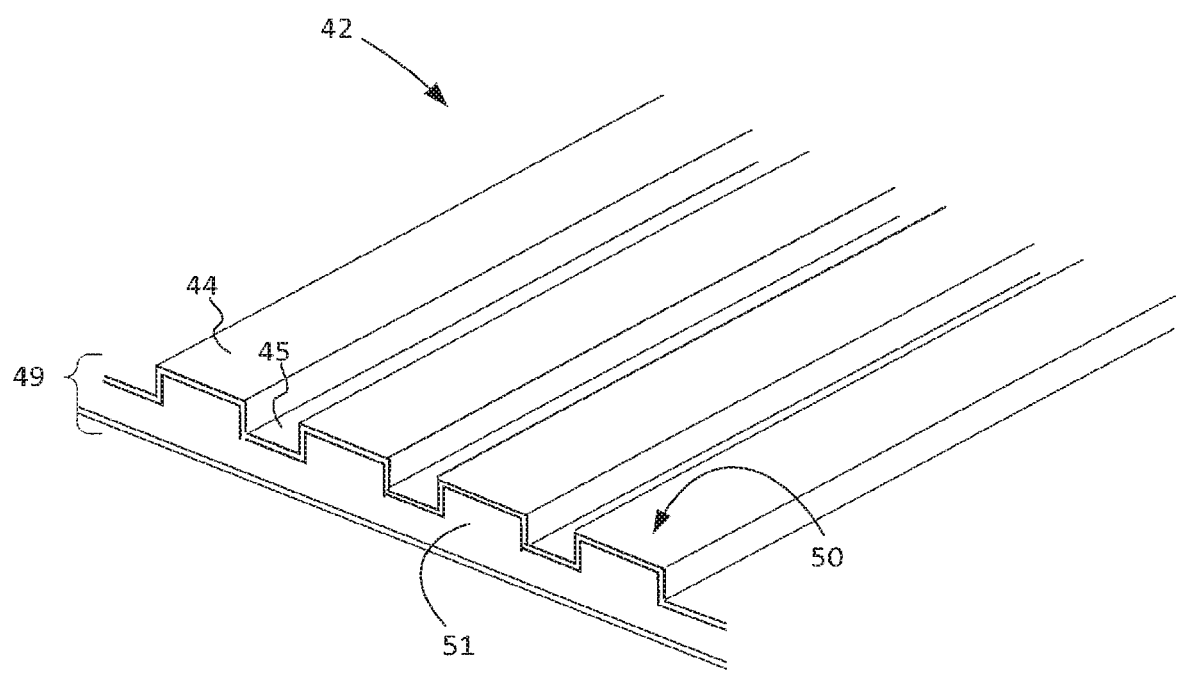

For further understanding of the disclosed concepts and embodiments, reference may be made to the following detailed description, read in connection with the drawings in which:

FIG. 1 is a longitudinal sectional view of an exemplary bypass configured gas turbine engine that may be equipped with the gear reduction architecture heat dissipation system described herein;

FIG. 2 is a cross-sectional side view of a geared bypass configured gas turbine engine within which an embodiment of the disclosed principles may be implemented;

FIG. 3 is a cross-sectional side view of a geared bypass configured gas turbine engine using an existing heat dissipation system;

FIG. 4 is a cross-sectional side view of a geared bypass configured gas turbine engine in accordance with an embodiment of the disclosed principles;

FIG. 5 is a cross-sectional view of a fan exit guide vane incorporating two surface coolers in accordance with an embodiment of the disclosed principles; and FIG. 6 is a top cross-sectional view of a surface cooler in accordance with an embodiment of the disclosed principles.

DETAILED DESCRIPTION

In the disclosure that follows certain relative positional terms are used such as "forward", "aft", "upper", "lower", "above", "below", "inner", "outer" and the like. These terms are used with reference to the normal operational attitude of a jet engine and should not be considered otherwise limiting. The forward end of a jet engine generally refers to the air inlet end and the aft end generally refers to the exhaust end. Also, "radially outward" generally refers to a direction away from the engine center line while "radially inward" refers to a direction toward the engine center line.

Before describing specific improvements, a brief overview is given to familiarize the reader with the basic operational principles of a GTF engine. The core of a typical bypass configured gas turbine engine works by forcing compressed air into a combustion chamber where it is mixed with fuel and ignited so that the exhaust gases exit a downstream nozzle, thereby creating thrust. This is in addition to the thrust created by the bypass airflow. The exhaust gases also power one or more turbine stages which serve to power the core compressor stages and the fan.

FIG. 1 is a longitudinal sectional view of an example bypass configured gas turbine engine 10 that may be equipped with the cooling system of the present disclosure. The engine 10 comprises an air intake port 12, a fan 14 mounted on a hub 16 near the air intake port 12 and surrounded by a fan case 18 which is mounted within an engine housing (not shown), a low pressure compressor (LPC) chamber 20, an intermediate section 22 aft of the LPC chamber 20, a high pressure compressor (HPC) chamber 24, a combustion chamber or combustor 26, high and low pressure turbines 28, 30 that provide rotational power to the HPC 24 (from turbine 28) fan 14 and compressor blades (from turbine 30), and an exhaust outlet.

FIG. 2 is a schematic upper cross-sectional view of a geared bypass configured gas turbine engine 35 taken along the engine's central axis. As can be seen, the airflow paths through the bypass configured gas turbine engine 35 include primarily an engine core path 36 and an engine bypass path 37. Common to both paths 36, 37 is the fan 14 mounted on the hub 16 as described above. The fan case 18 defines an outer wall of the bypass path 37, while the external surface of the engine core and associated core cowl defines the inner wall of the bypass path 37. In an embodiment, the bypass configured gas turbine engine is a high-bypass engine exhibiting a bypass ratio greater than or equal to 8. A gear reduction architecture 39 links the turbine 30 to the fan 14. The gear reduction architecture 39 will be discussed in greater detail below.

Air within the engine core path 36 passes through several compressor stages 20, 24, through a combustion chamber 26 and out through one or more turbine stages 28, 30. The rotational power imparted to the fan 14 (mounted via the fan hub 16) by the turbine stages 30 serves to drive intake air into the engine core path 36 and the engine bypass path 37.

The rotational power is transferred to the fan 14 from the turbine stages, 30 via an engine shaft 38 linked to the fan 14 through a gear reduction architecture 39. In an embodiment, the gear reduction architecture 39 is a planetary gear configuration, e.g., wherein the engine shaft 38 drives a sun gear and the planetary gear carrier drives the fan 14.

As with many high performance mechanical systems, the gear reduction architecture 39 is lubricated both for friction reduction and for cooling. In turn, heat energy absorbed by the lubricating oil is preferably removed to prevent overheating, lubricating oil breakdown, and resultant component degradation.

One known method to cool the lubricating oil for the gear reduction architecture 39 is shown in the illustration of FIG. 3. As can be seen, in this system, a bypass airflow shunt path 40 is provided within the inside wall of the engine bypass path 37. The bypass airflow shunt path 40 allows a portion of the airflow within the bypass path 37 to be diverted through the bypass airflow shunt path 40 and then back into the engine bypass path 37.

An oil cooler 41 is located within the bypass airflow shunt path 40. Heated lubricating oil from the gear reduction architecture 39 is routed to the oil cooler 41. After being flowed through the oil cooler 41, the now-cooled lubricating oil is routed back to the gear reduction architecture 39 for continued use. In low bypass ratio engines, that is, in engines with a low ratio between the rate of air passing through the fan disk and bypassing the engine core to the rate of air passing through the engine core, fan pressure ratios are typically higher and this cooling system is generally acceptable. However, for higher performance engines, especially those with reduced fan pressure ratio, this method may become marginal or unacceptable.

In particular, as the bypass ratio of a geared bypass configured gas turbine engine becomes larger with corresponding reduction in fan pressure ratio to provide enhanced engine propulsive efficiency for subsonic flight, the sensitivity to aerodynamic pressure loss in the bypass flow stream increases and becomes even more pronounced. As such, the airflow disruption resulting from the bypass airflow shunt path 40 begins to substantially impact engine performance and efficiency in engines with increased bypass ratios. Moreover, even in engines with lower bypass ratios, minimization of aerodynamic disturbances in the airflow paths as provided by the disclosed technique can be beneficial.

In an embodiment, an aerodynamically less intrusive cooling strategy is provided to cool the lubricating oil of the gear reduction architecture 39 without substantial interruption in the bypass air flow. In an aspect of this embodiment, surface coolers are provided on existing structures in the bypass airflow path 37, thus utilizing the bypass air flow for cooling, yet avoiding the inducement of additional aerodynamic disturbances in the air flow path 37.

In one aspect of this embodiment, the existing fan exit guide vanes (FEGVs) of the engine 35 are employed to support one or more such surface coolers. The schematic illustration of FIG. 4 shows a cross-sectional side view of a geared bypass configured gas turbine engine 35 as in FIG. 2, with a surface cooler 42 installed on the FEGV 43. It will be appreciated that a similar surface cooler may be installed on all other or some other FEGVs in the engine 35. The surface cooler 42 absorbs heat energy from oil flowing to the cooler 42 from the gear reduction architecture 39. An exposed surface of the surface cooler 42 is exposed to the airflow in the engine bypass path 37. Thus, during operation of the engine 35, as the bypass air proceeds through the engine bypass path 37, the air passes the FEGV 43 and thereby passes over the surface cooler 42, carrying away excess heat and cooling the oil for reuse in the gear reduction architecture 39.

The extent and configuration of the surface cooler 42 may be varied depending upon the cooling needs of any particular installation as well as the plan view and cross-sectional shapes of the FEGV 43. In an embodiment, the surface cooler 42 may have a plan view shape generally following the plan view shape of the FEGV 43. In top cross-section, as illustrated in FIG. 5, the surface cooler 42 may have fins or lands 44 parallel to the surface of the FEGV 43 and in line with the direction of airflow to minimize turbulence and aerodynamic disturbance. Other external features intended to promote an enhancement in convective heat transfer between the bypass air 37 and oil within the surface cooler 42 maybe used in conjunction with or in place of the fins and lands described. The fins or lands 44 may extend into the airflow beyond the surface of the FEGV 43, while the grooves 45 may be coplanar with the surface of the FEGV 43. Although the figure illustrates a surface cooler 42 on each of two opposing sides of the FEGV 43, it will be appreciated that a suitable implementation may also include only a single surface cooler 42 on each FEGV 43 depending upon any installation restrictions, designer preferences, heat load to be dissipated etc.

As discussed above, in an embodiment, the surface cooler 42 comprises lands 44 and grooves 45. In an aspect of this embodiment, the lands 44 and grooves 45 define an external surface bounding an internal passage as shown in FIG. 6. In particular, each surface cooler 42 may comprise a container 49 having a front surface 50 that is exposed to the airflow in the engine bypass path 37. The lands 44 and grooves 45 are fanned in this surface 50. Together with the remainder of the surface cooler 42, the front surface 50 forms an internal cavity 51 through which heated oil is flowed. The heated oil transfers heat energy to the front surface 50, and the front surface 50 transfers the absorbed heat energy to the ambient airflow in the engine bypass path 37.

Although the surface cooler 42 is shown having lands 44 and grooves 45, it will be appreciated that a different surface configuration may be used without departing from the scope of these teachings. For example, rounded or saw tooth-shaped rather than squared corners may define the lands 44 and grooves 45. Alternatively, a surface devoid of lands 44 and grooves 45 may be utilized depending upon the airflow characteristics and the heat load to be dissipated.

While the illustrations show the surface cooler 42 located on an FEGV 43, surface coolers 42 may additionally or alternatively be mounted in other locations. For example, as illustrated in FIG. 4, possible locations to be used instead of or in combination with the FEGV 43 include a location A in the fan case flow path aft of fan 14, a location B on the nacelle outer surface using free-stream air for cooling, a location C in the fan discharge flow path in the nacelle, a location D on the engine pylon using free-stream air to cool, and a location E in the core cowl flow path using the fan discharge to cool.

While the present disclosure has shown and described details of exemplary embodiments, it will be understood by one skilled in the art that various changes in detail may be effected therein without departing from the spirit and scope of the disclosure as defined by claims supported by the written description and drawings. Further, where these exemplary embodiments (and other related derivations) are described with reference to a certain number of elements it will be understood that other exemplary embodiments may be practiced utilizing either less than or more than the certain number of elements.

What is claimed is:

1. A cooling system for a bypass configured gas turbine engine having a bypass airflow path and a fan exit guide vane extending through the bypass airflow path, the cooling system comprising:
   a lubricated mechanical system having an internal cavity adapted to contain lubricating oil;
   a surface cooler operably connected to the fan exit guide vane and extending into the bypass airflow path beyond a surface of the fan exit guide vane; and
   one or more fluid conduits linking the internal cavity of the lubricated mechanical system to the surface cooler such that the surface cooler reduces a temperature of the lubricating oil,
   wherein the surface cooler has a plan view shape generally following a plan view shape of the fan exit guide vane, a front surface of the surface cooler being exposed to airflow in the bypass airflow path, the front surface forming fins or lands, and grooves parallel to the surface of the fan exit guide vane and in line with a direction of the airflow, the fins or lands extending into the airflow beyond the surface of the fan exit guide vane and the grooves being coplanar with the surface of the fan exit guide vane, the front surface of the surface cooler forming an internal cavity for the surface cooler through which heating oil is flowed.

2. The cooling system for a bypass configured gas turbine engine in accordance with claim 1, wherein the lubricated mechanical system comprises a fan drive gear reduction architecture powering a fan of the bypass configured gas turbine engine.

3. A method for cooling lubricating oil used in a lubricated mechanical system associated with a bypass configured gas turbine engine having a bypass airflow path and the cooling system for the bypass configured gas turbine engine of claim 1, the method comprising:
   mounting the surface cooler to a structure within the bypass airflow path, within the bypass configured gas turbine engine; and
   routing the lubricating oil from the lubricated mechanical system to the surface cooler such that during operation of the bypass configured gas turbine engine, the surface cooler will cool the lubricating oil.

4. The method for cooling lubricating oil used in a lubricated mechanical system associated with a bypass configured gas turbine engine in accordance with claim 3, wherein the lubricated mechanical system comprises a fan drive gear reduction architecture powering a fan of the bypass configured gas turbine engine.

* * * * *